B. F. LUCE.
Gate.
No. 225,841. Patented Mar. 23, 1880.
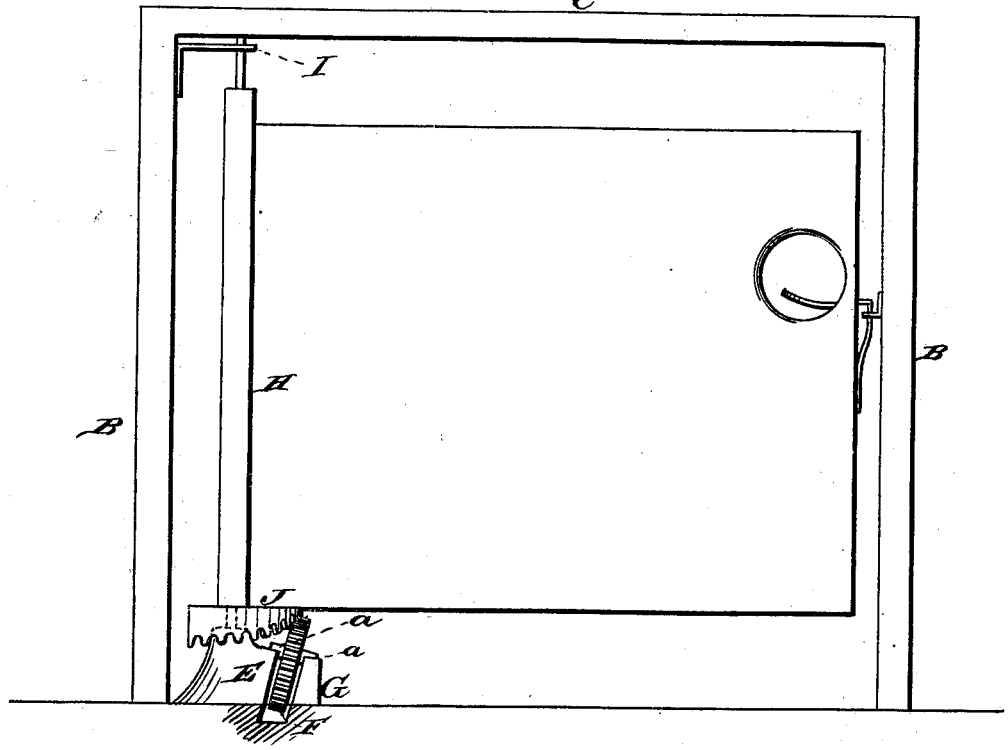
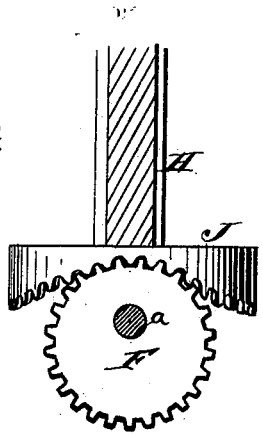
WITNESSES
Robert Everett
James J. Sheehy
INVENTOR
Benjamin F. Luce
Gilmore Smith & Co.,
ATTORNEYS

UNITED STATES PATENT OFFICE.

BENJAMIN F. LUCE, OF JANESVILLE, MINNESOTA.

GATE.

SPECIFICATION forming part of Letters Patent No. 225,841, dated March 23, 1880.

Application filed July 8, 1879.

*To all whom it may concern:*

Be it known that I, BENJAMIN F. LUCE, of Janesville, in the county of Waseca and State of Minnesota, have invented a new and useful Improvement in Gates; and I do hereby declare that the following is a full, clear, and exact description of the same, reference being had to the accompanying drawings, in which—

Figure 1 is a side elevation; and Fig. 2 is a detail view, showing the gear-wheels which operate the gate.

My invention is an improvement in the class of laterally-swinging gates having hinges or hinge attachments consisting of a roller and an inclined plane resting thereon, the two co-operating in such a manner as to render the gates self-closing.

My invention consists in the construction and combination of parts, as hereinafter described and claimed.

In accompanying drawings I show a gate adapted to swing laterally in a skeleton-frame, B C. Its upper pivot has its bearing in an arm, I, attached to post B, and a bearing-block or gear, J, of peculiar construction, is attached to the lower end of its pivot-post H. Said gear J has a toothed rim, which is formed of pendent circular wings or flanges that are inclined upward to their point of junction, which is at the middle of the front part of the gear. Thus the toothed rim of the latter is in the nature of a double inclined plane.

The gear J rests on and meshes with a spur-gear, F, and rides up on the latter when the gate swings open, said gear F, which is concavo-convex in form and mounted eccentrically on its axis *a*, having its bearings in a slotted block, G, placed in front of the gate-pivot.

The concave and convex sides of such gear F are coincident, or nearly so, with arcs of circles described from the gate-pivot, the object being to avoid the cross-friction which would be otherwise incident to the coaction of the two gears.

By locating the gear F in front of the gate-pivot it is made to support a portion of the weight of the gate, so that its pivots (more especially the upper one) are correspondingly relieved of strain and friction, and the gate thereby enabled to swing more easily.

The eccentricity of the gear F causes it to co-operate with the gear J in elevating the gate as it swings open, and assists in bringing the gate quickly to rest when it swings back. The provision of meshing teeth on the respective gears is necessary to prevent one sliding on the other while the gate is being opened or closed.

I am aware that a double incline having a plane under surface has been attached to a gate in rear of its upper pivot and arranged to work on a wheel or roller having a plain periphery.

I claim—

In combination with the gate and toothed gear J, attached to the under side of the former in front of its pivot, the gear F, which is of concavo-convex shape and mounted eccentrically on its shaft, as shown and described, for the purpose specified.

B. F. LUCE.

Witnesses:
 JOB MORSE,
 N. J. O'GRADY.